US006909412B2

United States Patent
Son (10) Patent No.: US 6,909,412 B2
(45) Date of Patent: Jun. 21, 2005

(54) METHOD FOR DRIVING LIQUID CRYSTAL OF THIN FILM TRANSISTOR LIQUID CRYSTAL DISPLAY

(75) Inventor: Hyeon Ho Son, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 407 days.

(21) Appl. No.: 09/891,504

(22) Filed: Jun. 27, 2001

(65) Prior Publication Data

US 2002/0027539 A1 Mar. 7, 2002

(30) Foreign Application Priority Data

Jul. 6, 2000 (KR) .......................................... 2000-38657

(51) Int. Cl.[7] ................................................ G09G 3/36
(52) U.S. Cl. .............................. 345/87; 349/33; 349/34
(58) Field of Search ............................... 345/87, 90–98, 345/99, 102, 107, 211, 212–215; 349/33, 34, 42, 76, 123, 177, 191

(56) References Cited

U.S. PATENT DOCUMENTS

| | | | | |
|---|---|---|---|---|
| 6,069,620 A | * | 5/2000 | Nakamura et al. | .......... 345/214 |
| 6,221,444 B1 | * | 4/2001 | Okada et al. | .............. 428/1.25 |
| 6,456,266 B1 | * | 9/2002 | Iba et al. | ....................... 345/87 |
| 6,469,762 B1 | * | 10/2002 | Hong et al. | .................. 349/123 |
| 6,476,792 B2 | * | 11/2002 | Hattori et al. | ............... 345/102 |
| 6,542,221 B1 | * | 4/2003 | Tang et al. | ..................... 355/55 |

OTHER PUBLICATIONS

Hattori et al. Pub. No.: US 2003/0001809 A1.*
Koma et al. Japan Pub. No.: 2000–321556.*

* cited by examiner

Primary Examiner—Regina Liang
Assistant Examiner—Jennifer T Nguyen
(74) Attorney, Agent, or Firm—Morgan Lewis & Bockius LLP (57) ABSTRACT

A method for driving a liquid crystal of a thin film transistor liquid crystal display, the method comprising the steps of applying a first voltage corresponding to a real data during a data voltage applying frame and applying a second voltage for maintaining a bend state and preventing the liquid crystal from restoring to a splay state during a maintenance voltage applying frame, wherein the real one frame for driving the liquid crystal includes the data voltage applying frame and the maintenance voltage applying frame subsequent to the data voltage applying frame, and the data voltage applying frame is a data applying time and the maintenance voltage applying frame is a maintenance time, and the data voltage applying frame and the maintenance voltage applying frame are determined by a period of a signal applying to a gate of the liquid crystal display.

11 Claims, 6 Drawing Sheets

Black state(V=Vmax)

↕ DRIVING RANGE(Vmax-Vtr)

FIG. 3B

White state(V>Vtr)

⬇ UNSTABLE

FIG. 3C

Splay state(V<Vtr)

METHOD FOR DRIVING LIQUID CRYSTAL OF THIN FILM TRANSISTOR LIQUID CRYSTAL DISPLAY

This application claims the benefit of Korean Application No. 10-2000-38657 filed Jul. 6, 2000, which is hereby incorporated by reference.

BACKGROUND OF THE INVENTION

1. Field of the Invention

The present invention relates to a liquid crystal display, and more particularly, to a method for driving a liquid crystal of a thin film transistor liquid crystal display (TFT-LCD). Although the present invention is suitable for a wide scope of applications, it is particularly suitable for preventing a bend state of the liquid crystal from restoring to a splay state even when an applied data voltage is lower than a transition voltage.

2. Discussion of the Related Art

Figure 1:
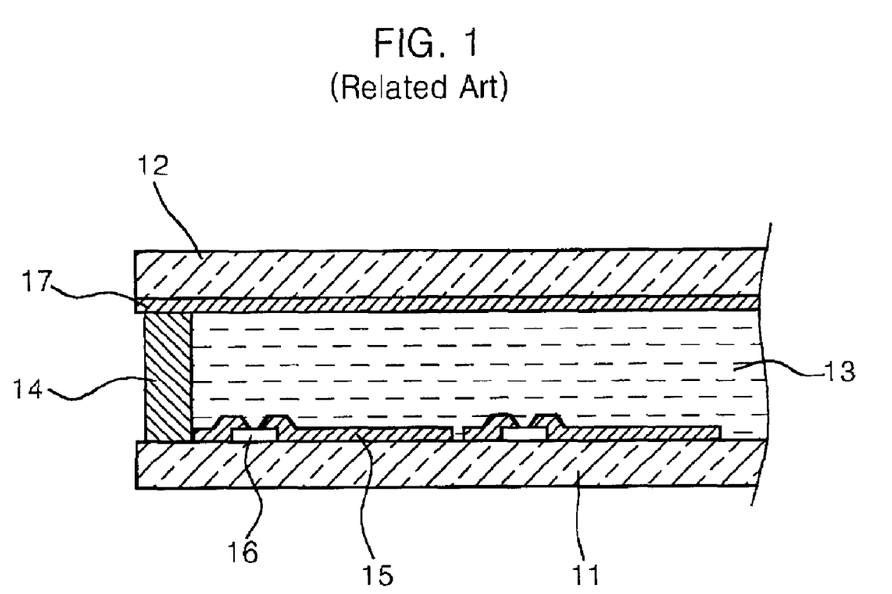
FIG. 1 is a cross-sectional view of a thin film transistor liquid crystal display in the background art.

In a liquid crystal display of the background art, as shown in FIG. 1, glass substrates 11 and 12 are facing into each other and separated by a spacer (not shown), thereby providing a space for a cell gap. A liquid crystal 13 is injected into the space and sealed by a sealing member 14.

Further, a plurality of pixel electrodes 15 are formed on the inner surface of the glass substrate 11. A thin film transistor 16 serving as a switching element is formed at each pixel electrode 15. An orientation film (not shown) is formed on the pixel electrodes 15. A drain electrode of the thin film transistor will be connected to the pixel electrode 15. In the meantime, a transparent common electrode 17, facing into the pixel electrodes 15, is formed at the inner surface of the transparent substrate 12, and another orientation film is formed on the common electrode 17.

Figure 2:
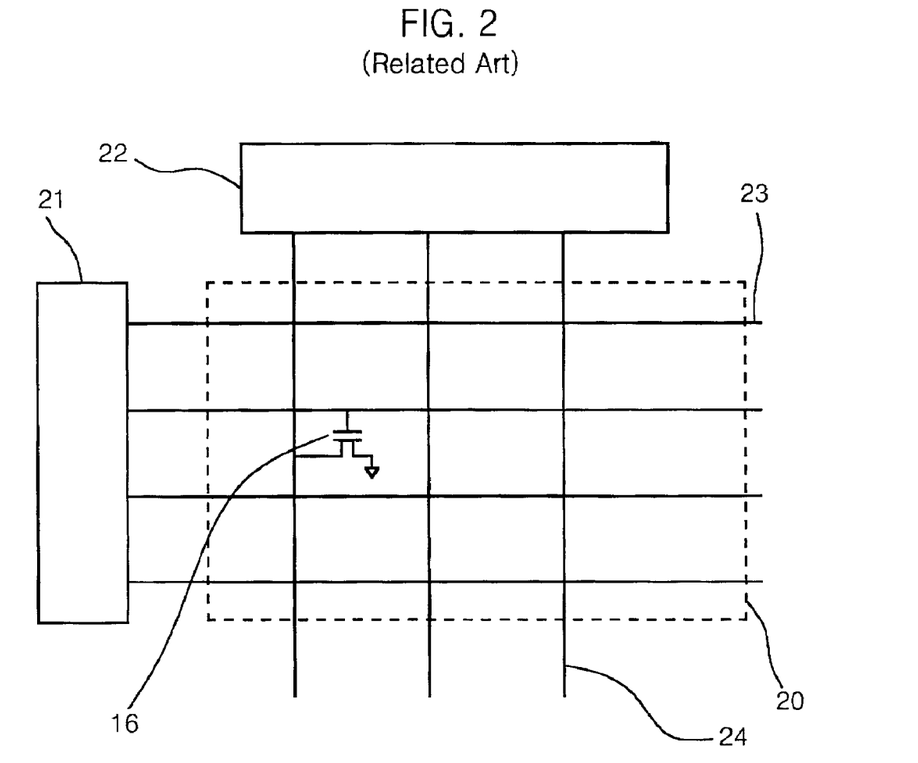
FIGS. 2 is a schematic diagram of a thin film transistor liquid crystal display including a drive circuit in the background art.

FIG. 2 is a schematic view of a liquid crystal display implemented with a drive circuit in the background art. As sown in FIG. 2, the liquid crystal display includes a liquid crystal panel 20, a scan drive circuit 21, and a signal drive circuit 22 for driving the liquid crystal panel.

More specifically, the liquid crystal panel 20 includes a plurality of scanning lines 23 and a plurality of signal lines 24 intersect each other on a substrate in a matrix form. At the intersecting portion, a thin film transistor 16 and a pixel are disposed therein.

The scan drive circuit 21 sequentially applies a scanning signal, such as an ON signal to the gate of the thin film transistor and the scanning line. The signal drive circuit 22 applies an image signal to the signal line, so that the image signal can be transferred to the pixel through the thin film transistor 16 driven by the scanning signal.

The liquid crystal display is driven on the basis of the following principle. When the scan drive circuit 21 sequentially applies the scanning signal to the scanning line 23 of the liquid crystal panel 20, all of the thin film transistors 16 connected to the scanning line receiving the scanning signal are on. The signal applied to the signal line 24 of the liquid crystal panel 20 is transferred to the pixel through the source and the drain of the activated thin film transistor 16.

According to the above-mentioned driving principle, a pulse signal is sequentially applied to all gate electrodes. Thus, a signal voltage is applied to the corresponding source electrode, so that all pixels of the liquid crystal panel can be driven. In this way, an image of one frame is displayed, and images of other frames are then sequentially displayed, so that moving images can be displayed.

In displaying the image in the above-described way, a color image including enormous information cannot be displayed by driving only black and white states. Therefore, in performing a contrast display, there are several intermediate states between the black and the white states.

In a black and white liquid crystal display, when an intermediate voltage between the black and the white states is applied, an intermediate state such as the gray state displays information. In order to obtain an intermediate value of the voltage, the amplitude of the voltage pulse or the intensity of the voltage applied to the liquid crystal is adjusted.

In a color liquid crystal display, a displayed color is determined according to a degree of the contrast display. When a drive integrated circuit (IC) of six bits is used, sixty-four contrasts can be generated. In audio/video equipment or a monitor, which requires full colors, 256 contrasts can achieve more than 16,000,000 colors. As described above, since a liquid crystal display is equipment that displays information on a screen by adjusting a voltage applied to the liquid crystal, contrast is adjusted by changing a transmitting degree of light depending on the applied voltage.

Figure 3A:
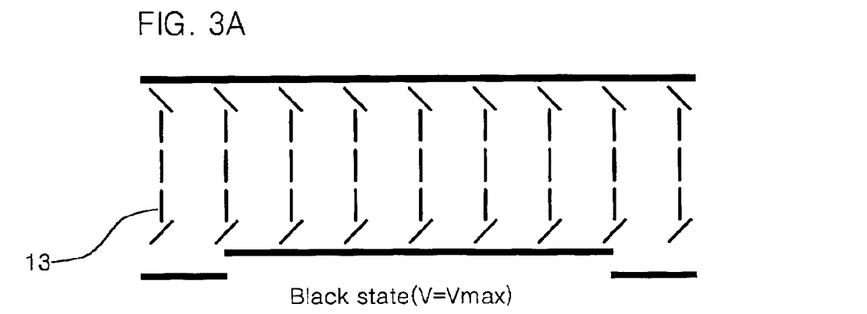
FIGS. 3A to 3C are schematic diagrams illustrating a state transition of a liquid crystal according to applied voltages at a black state, a white state, and a splay state, respectively.
Figure 3B:
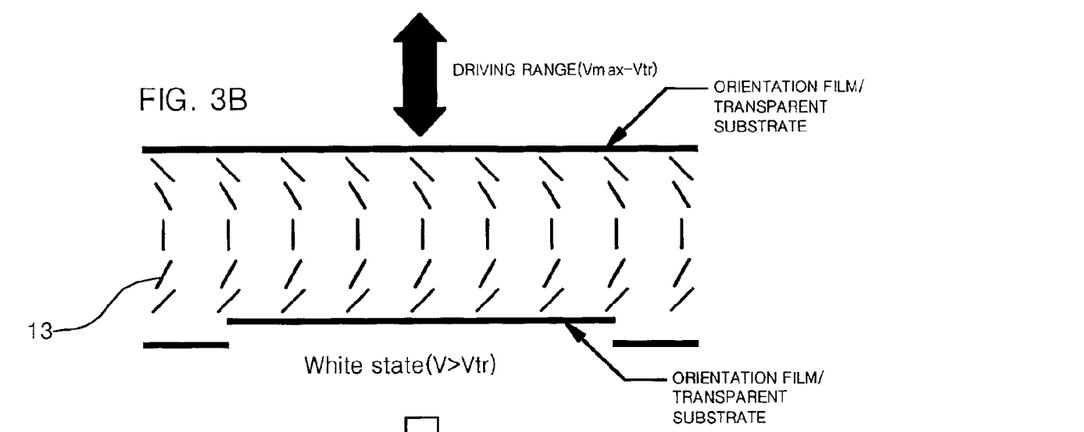
Figure 3C:
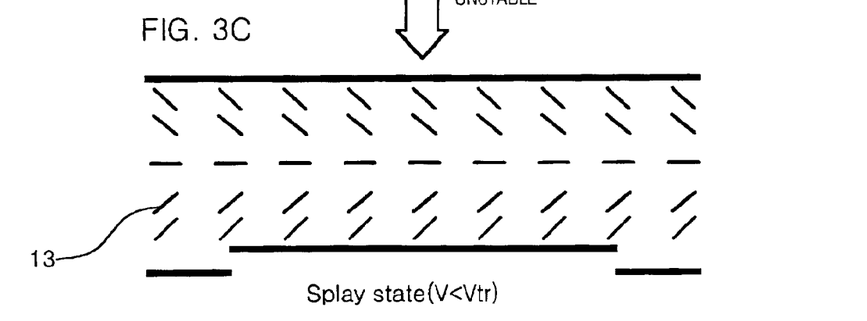

FIGS. 3A to 3C are schematic views for describing a state transition of a liquid crystal 13 according to the applied voltages at a black state, a white state, and a splay state, respectively. In general, in a construction where the liquid crystal is oriented in parallel, a bend alignment is stable when the applied voltage is greater than a threshold voltage Vtr for a state transition. Conversely, a splay alignment is stable when the applied voltage is below the threshold voltage.

Therefore, when a state where the liquid crystal driving voltage V is lower than the threshold voltage Vtr, the bend alignment is unstable. This is because a state transition into the splay state occurs for several seconds or several minutes, as shown in FIG. 3C.

An electrically controlled birefringence (ECB) mode has been proposed to obtain a wide viewing angle in a liquid crystal display. In the ECB mode, when a voltage is applied to a liquid crystal cell, an arrangement of liquid crystal molecules changes due to a dielectric anisotropy of the liquid crystal. Thus, a birefringence index of the liquid crystal cell changes a light transmission factor.

Among the ECB mode, an optically compensated birefringence (OCB) mode, or a π-cell mode is widely adopted to utilize the characteristic of the bend alignment state.

In the OCB mode, molecules of the liquid crystal are arranged to be the splay alignment in the initial state where a voltage is not applied and the liquid crystal located at the upper and the lower substrates are oriented with the same direction, as shown in FIG. 3C.

When a voltage greater than the transition voltage Vtr is applied to the liquid crystal panel, the liquid crystal experiences a transition from the splay alignment to the bend alignment as shown in FIG. 3B. In general, in the OCB mode, the applied voltage must be always maintained higher than the transition voltage Vtr so as to stabilize the bend alignment. Further, by controlling a driving voltage over the transition voltage Vtr, a distribution of the molecules of liquid crystal is adjusted, thereby controlling a transmission factor.

In the OCB mode, since asymmetric alignments in upward and downward directions and left and right directions are eliminated through the bend alignment as shown in FIG. 3B, the characteristic of the viewing angle is much improved. Also, a wide viewing angle is achieved in comparison with the conventional type liquid crystal cell. However, even in the OCB mode having the above-mentioned bend alignment, an additional voltage for forming the bend alignment is necessary. Moreover, as described above, there are several problems such as instability of the bend alignment yet to be resolved.

Further, since the OCB mode utilizes the characteristic of the bend alignment, an operation range is limited to the applied voltage over the transition voltage Vtr from the initial splay state to the bend state. Thus, a maximum value Vmax of the driving voltage is too large to obtain a desired brightness or a desired contrast ratio (C/R). A contrast ratio is an indicator for estimating vividness of an image on the screen. The larger in a difference of the brightness is, the more vivid the image is. As a result, it is difficult to select a drive circuit or a drive IC. Moreover, a high pre-tilt and a high cell gap are inevitable in implementing the device.

SUMMARY OF THE INVENTION

Accordingly, the present invention is directed to a method for driving liquid crystal of a thin film transistor liquid crystal display that substantially obviates one or more of problems due to limitations and disadvantages of the related art.

An object of the present invention is to provide a method for driving liquid crystal of a thin film transistor-liquid crystal display that prevents a restoration to the splay alignment even when a data voltage lower than the transition voltage is utilized.

Additional features and advantages of the invention will be set forth in the description that follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for driving a liquid crystal of a thin film transistor liquid crystal display, the method comprising the steps of applying a first voltage corresponding to a real data during a data voltage applying frame and applying a second voltage for maintaining a bend state and preventing the liquid crystal from restoring to a splay state during a maintenance voltage applying frame, wherein the real one frame for driving the liquid crystal includes the data voltage applying frame and the maintenance voltage applying frame subsequent to the data voltage applying frame, and the data voltage applying frame is a data applying time and the maintenance voltage applying frame is a maintenance time, and the data voltage applying frame and the maintenance voltage applying frame are determined by a period of a signal applying to a gate of the liquid crystal display.

In another aspect of the present invention, a method for driving a liquid crystal of a thin film transistor liquid crystal display, the method comprising the steps of applying a data voltage to a pixel for driving the liquid crystal, and applying a maintenance voltage to the pixel for preventing a restoration to a splay state before the liquid crystal driven by the data voltage is restored to the splay state from a bend state.

In a further aspect of the present invention, a method for driving a liquid crystal of a thin film transistor liquid crystal display, wherein the thin film transistor includes first and second substrates having first and second orientation directions parallel to each other and the liquid crystal has a splay state without applying a driving voltage, the method comprising the steps of applying a first voltage corresponding to a real data during a data voltage applying frame; and applying a second voltage for maintaining a bend state and preventing the liquid crystal from restoring to a splay state during the maintenance voltage applying frame, wherein the data voltage applying frame and the maintenance voltage applying frame are a data applying time and a maintenance time in the real one frame, respectively.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 4:
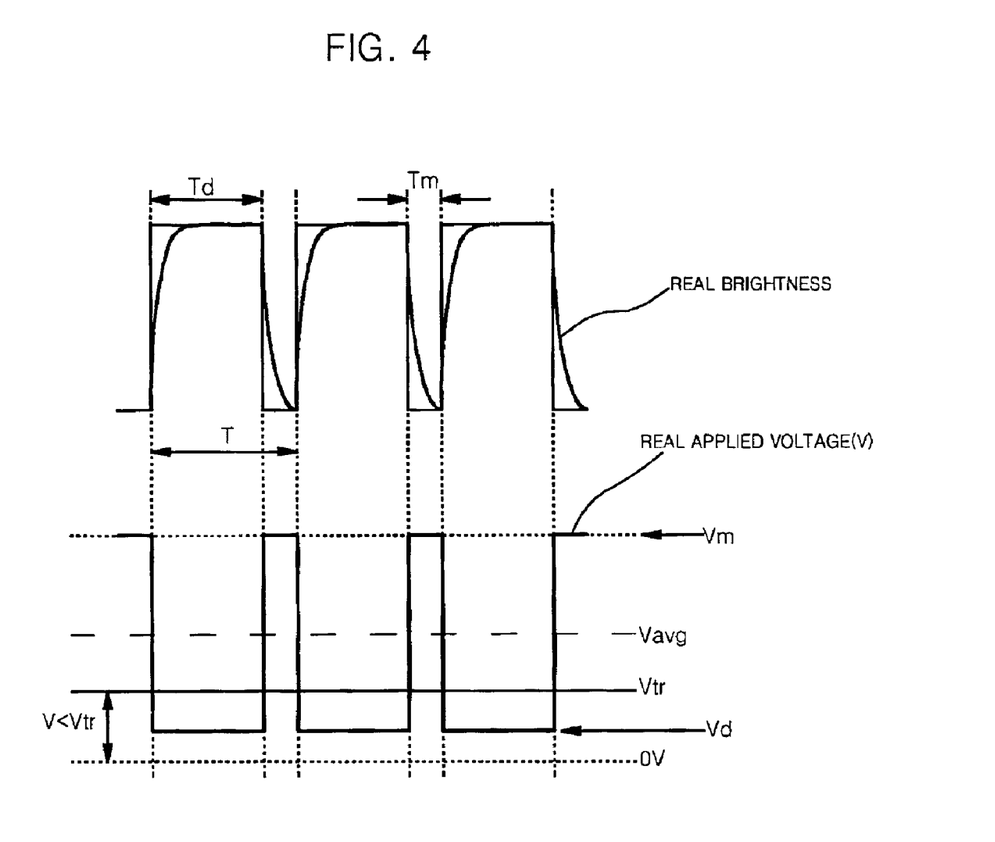
FIG. 4 is a wave diagram illustrating a method for driving a liquid crystal of a thin film transistor liquid crystal display according to a first embodiment of the present invention.

FIG. 4 is a wave diagram illustrating a method for driving liquid crystal of a thin film transistor liquid crystal display according to a first embodiment of the present invention.

More specifically, a real brightness in each pixel and a real applied voltage corresponding to the real data are illustrated in FIG. 4. A voltage Vd is an applied voltage during a data maintenance time Td (i.e., a data voltage-applying frame) in a real one frame T. A voltage Vm is an applied voltage for maintaining a bend state during the subsequent time Tm (i.e., a maintenance voltage-applying frame). Here, Tm is a value subtracting Td from T.

The real one frame T consists of two frames Td and Tm determined by the gate signal-applying period of the thin film transistor. In other words, one frame is an interval between the time when the gate signal is applied to the first gate line of the thin film transistor and the time when the gate signal is applied again to the first gate line after the last gate line is applied by the gate signal. In the present invention, since two kinds of signals Vd and Vm are applied in one frame, two frames constitute a real one frame in considering the signals applied to the gate lines to apply two kinds of signals Vd and Vm as data to one pixel.

The first frame Td in the real one frame is a data voltage-applying frame, and the second frame Tm is a maintenance voltage-applying frame. In the first frame Td, a real data signal or a data voltage Vd is applied between the time when the gate signal is applied to the first gate line of the thin film transistor and the time when the gate signal is applied to the last gate line of the thin film transistor. In the second frame Tm, a maintenance voltage data signal or a maintenance voltage Vm is applied between the time when the gate signal is applied to the first gate line of the thin film transistor and the time when the gate signal is applied to the last gate line of the thin film transistor. Therefore, the real one frame employed in the present invention includes the two frames as described above.

The above-described voltages have a relationship as the following equation: $Vavg=(Vd \times Td + Vm \times Tm)/T \geq Vtr$. The voltage Vd corresponds to the real data and is applied during the time Td. The voltage Vm is applied during Tm to prevent a restoration from the bend state to the splay state. Thus, even when the voltage V applied to one pixel in one frame T is lower than the threshold voltage Vtr (i.e., V<Vtr), the average voltage Vavg is maintained larger than the threshold voltage Vtr. As a result, a restoration to the splay state is prevented and a stable bend state can be maintained.

Since a bend state has a high retardation below the threshold voltage Vtr in the present invention, the retardation can be changed in the range as broad as possible in the bend state. That is, the range of the real applied voltage V is expanded to a value below the threshold voltage Vtr of the restoration to the splay state, so that a broad driving range even below the threshold voltage Vtr is achieved.

Therefore, problems of the bend cell, such as a high cell gap, a high pre-tilt, a large compensation film, and a high driving range, are resolved in the present invention. In addition, a motion blurring in the liquid crystal is also improved.

Figure 5:
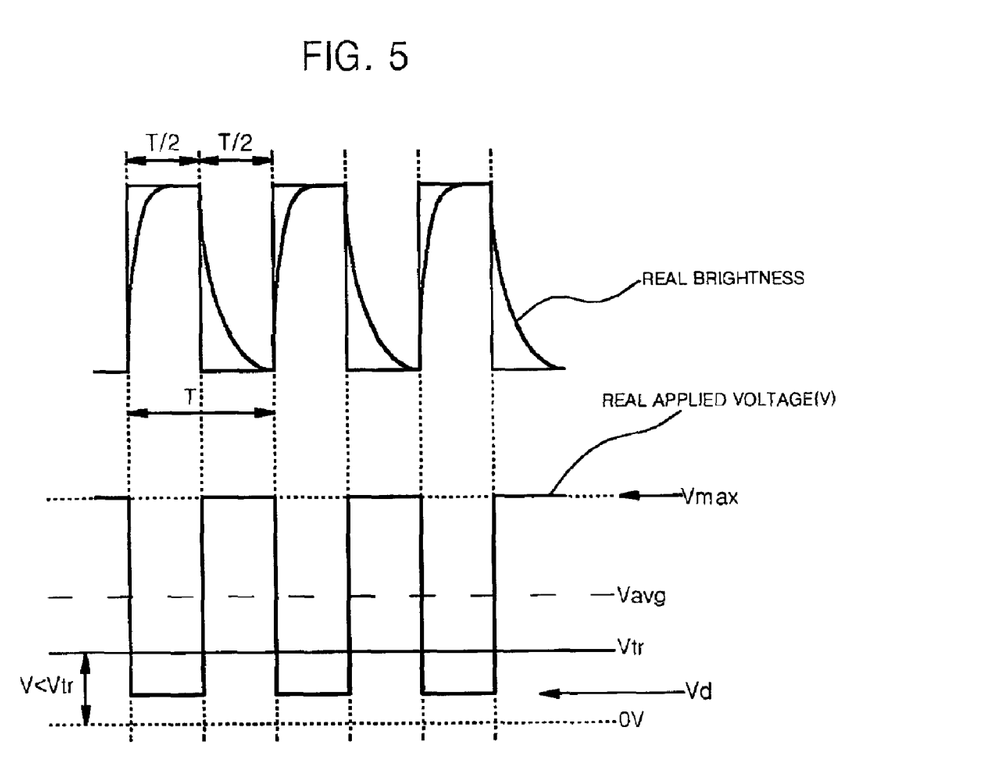
FIG. 5 is a wave diagram illustrating a method for driving a liquid crystal of a thin film transistor liquid crystal display according to a second embodiment of the present invention.

FIG. 5 is a wave diagram illustrating a method for driving a liquid crystal of the thin film transistor liquid crystal display according to a second embodiment of the present invention. More specifically, FIG. 5 illustrates brightness of a real driven pixel in a real one frame (16.7 msec). A voltage Vd corresponding to the real data is applied during a half time T/2. A maximum driving voltage Vmax is applied during the other half time. Meanwhile, in the sixty hertz driving, one frame is 16.7 msec, which means 1/60 second. According to this embodiment of the present invention, in order to make the real one frame be 16.7 msec, 8.35 msec (1/120 second) is assigned to each of the signals. This is because the two signals Vd and Vm must be processed (i.e., applied to the gate) during the real one frame as described above. Therefore, it takes 16.7 msec to process both of the signals when the data voltage applying frame Td and the maintenance voltage applying frame Tm have the same length of time.

As described above, the voltage Vd corresponding to the real data is applied during a half time T/2 and the maximum driving voltage Vmax is applied during the other half time. Even if the voltage V applied to one pixel in one frame T is lower than the threshold voltage Vtr of transition into the splay state (V<Vtr), the average voltage Vavg is maintained larger than the threshold voltage Vtr. Thus, a restoration to the splay state is prevented and a stable bend state can be maintained. As a result, a bend state having a high retardation below the threshold voltage Vtr can be utilized in the present invention. The retardation can be changed in the range as broad as possible in the bend state.

That is, the range of the real applied voltage V is expanded to the value below the threshold voltage Vtr of the restoration to the splay state. Thus, a broad driving range even below the threshold voltage Vtr is achieved. Therefore, problems of the bend cell, such as a high cell gap, a high pre-tilt, a large compensation film, and a high driving range, are improved in the present invention. Also, a motion blurring in a liquid crystal display is eliminated.

Figure 6:
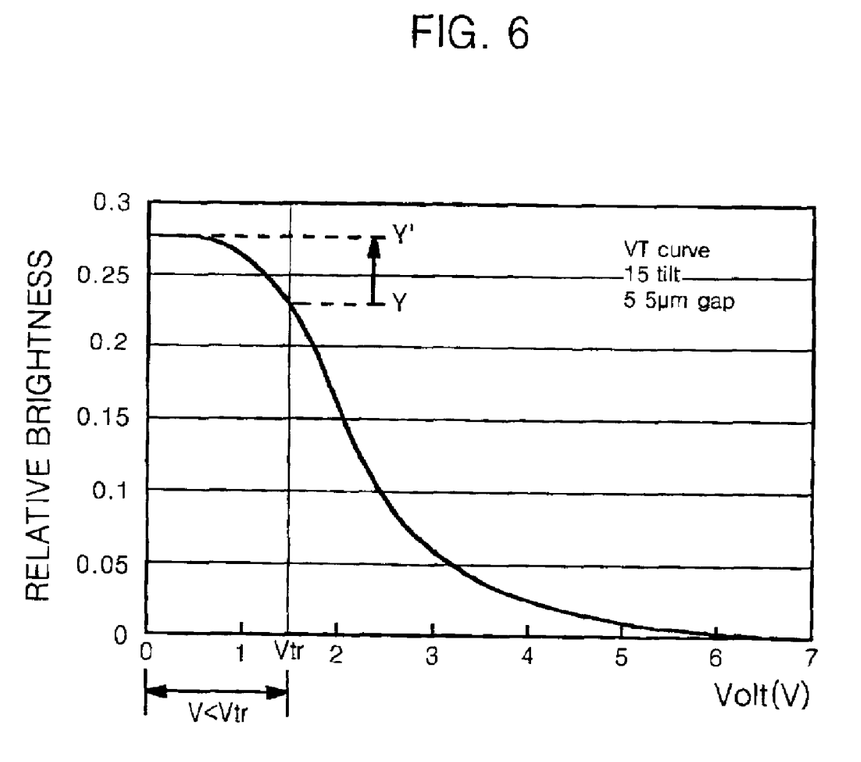
FIG. 6 is a graph of a voltage-transmittance curve (v-T curve) illustrating an improvement in brightness of the present invention.

FIG. 6 is a graph illustrating a voltage-transmittance curve (V-T curve) in the conventional OCB cell. As shown in FIG. 6, brightness is increased by more than fifteen percent when the liquid crystal is driven below the threshold voltage Vtr of restoration to the splay state (V<Vtr) in comparison with the case where the liquid crystal is driven over the threshold voltage Vtr (see Y→Y').

In the method for driving the liquid crystal of the thin film transistor liquid crystal display according to the present invention, a voltage over the threshold voltage of restoration to the splay state is applied to maintain a mean value of the voltage in the real one frame. Thus, even the bend alignment below the transition voltage can be utilized for a driving range. Therefore, the range of the liquid crystal driving voltage can be expanded to the value below the threshold voltage of state transition, and even the bend alignment below the threshold voltage can be utilized.

Consequently, the same quality of image is obtained even with a low pre-tilt, a low cell gap, and a low driving voltage. Especially, a blurring of a motion image, which is generated in a liquid crystal display when it is driven at a high speed in a normally white (NW) mode, can be prevented.

Further, according to the present invention, the liquid crystal display have a low cell gap, so as to have an improved speed of response. Moreover, the present invention overcomes a complexity in managing the applied voltage, which is a disadvantage of the OCB mode.

It will be apparent to those skilled in the art that various modifications and variations can be made in the method for driving a liquid of a thin film transistor liquid crystal display of the present invention without departing from the spirit or scope of the inventions. Thus, it is intended that the present invention covers the modifications and variations of this invention provided they come within the scope of the appended claims and their equivalents.

What is claimed is:

1. A method for driving a liquid crystal of a thin film transistor liquid crystal display, the method comprising the steps of:

applying a first voltage corresponding to a real data during a data voltage applying frame; and applying a second voltage for maintaining a bend state and preventing the liquid crystal from restoring to a splay state during a maintenance voltage applying frame, wherein the real one frame for driving the liquid crystal includes the data voltage applying frame and the maintenance voltage applying frame subsequent to the data voltage applying frame, and the data voltage applying frame is a data applying time and the maintenance voltage applying frame is a maintenance time, and the data voltage applying frame and the maintenance voltage applying frame are determined by a period of a signal applying to a gate of the liquid crystal display.

2. The method according to claim 1, wherein the first voltage, the second voltage, the data voltage applying frame, the maintenance voltage applying frame, and the real one frame satisfy the following equation: (the first voltage×the data voltage applying frame+the second voltage×the maintenance voltage applying frame)/the real one frame>=a threshold voltage, wherein the threshold voltage is a minimum voltage for the liquid crystal to transit to the bend state from the splay state.

3. The method according to claim 1, wherein each of the data voltage applying frame and the maintenance voltage-applying frame is a half of the real one frame.

4. The method according to claim 1, wherein the maintenance voltage is a maximum driving voltage.

5. A method for driving a liquid crystal of a thin film transistor liquid crystal display, wherein the thin film transistor includes first and second substrates having first and second orientation directions parallel to each other and the liquid crystal has a splay state without applying a driving voltage, the method comprising the steps of:

applying a first voltage corresponding to a real data during a data voltage applying frame; and applying a second voltage for maintaining a bend state and preventing the liquid crystal from restoring to a splay state during the maintenance voltage applying frame, wherein the data voltage applying frame and the maintenance voltage applying frame are a data applying time and a maintenance time in the real one frame, respectively.

6. The method according to claim 5, wherein the maintenance voltage applying frame is subsequent to the data voltage-applying frame.

7. The method according to claim 5, wherein the data voltage applying frame and the maintenance voltage applying frame are determined by a period of a signal applying to a gate of the liquid crystal display.

8. A The method according to claim 5, wherein an average voltage of the first voltage and the second voltage applied for driving the liquid crystal during the real one frame is greater than a threshold voltage which initiates a transition from the splay state to the bend state.

9. The method according to claim 8, wherein the first voltage, the second voltage, the threshold voltage, the data voltage applying frame, the maintenance voltage applying frame, and the real one frame satisfy the following equation:

(the first voltage×the data voltage applying frame+the second voltage×the maintenance voltage applying frame)/the real one frame≧the threshold voltage.

10. The method according to claim 5, wherein each of the data voltage applying frame and the maintenance voltage-applying frame is a half of the real one frame.

11. The method according to claim 5, wherein the maintenance voltage is a maximum driving voltage.

* * * * *